Figure 3:
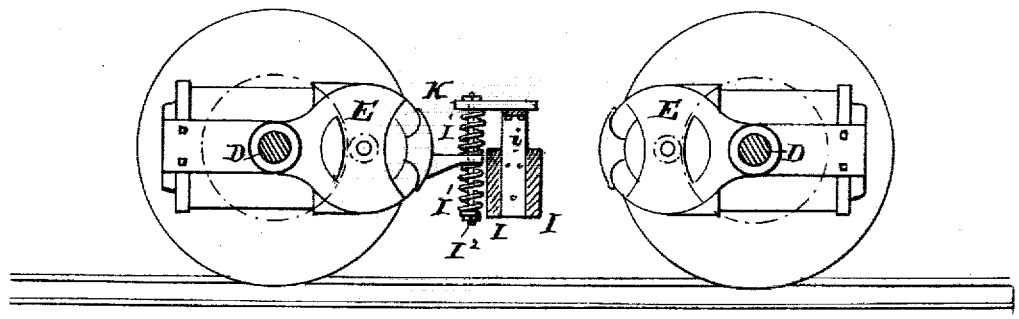

No. 826,508. PATENTED JULY 17, 1906.
R. M. HUNTER.
ELECTRICALLY PROPELLED VEHICLE.
APPLICATION FILED NOV. 15, 1898.
2 SHEETS—SHEET 1.
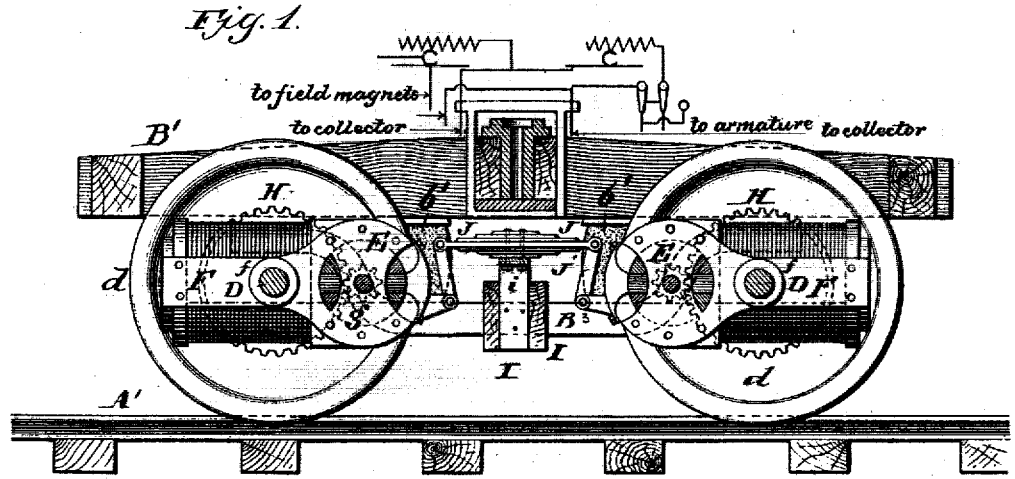
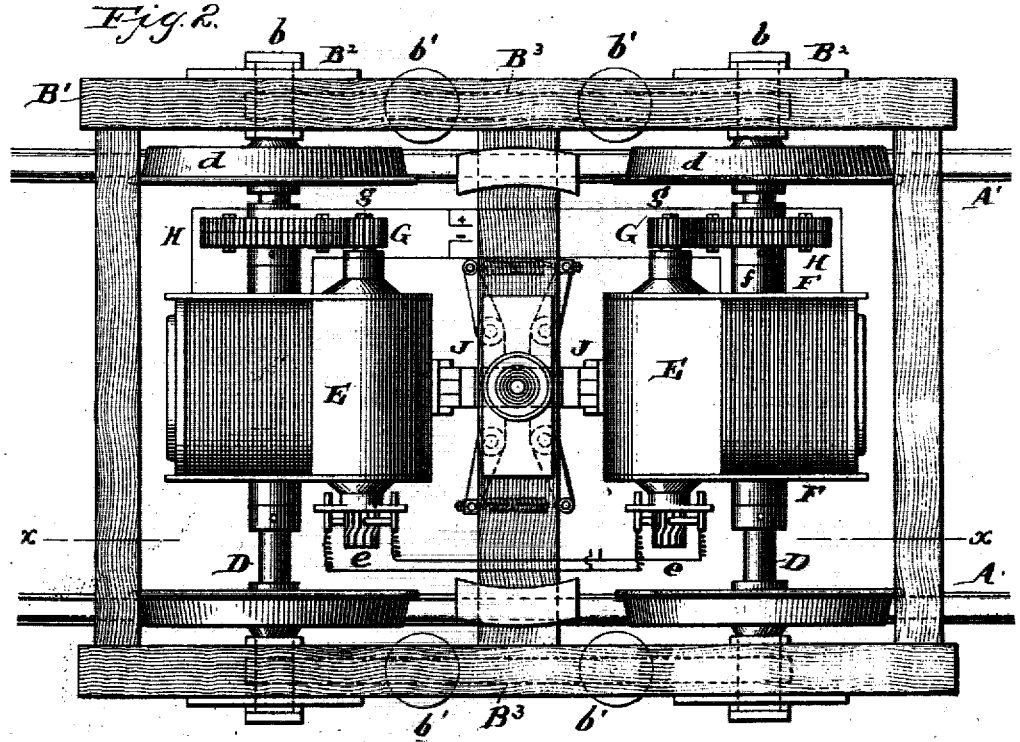

No. 826,508. PATENTED JULY 17, 1906.
R. M. HUNTER.
ELECTRICALLY PROPELLED VEHICLE.
APPLICATION FILED NOV. 15, 1898.

2 SHEETS—SHEET 2.

Witnesses

Inventor

UNITED STATES PATENT OFFICE.

RUDOLPH M. HUNTER, OF PHILADELPHIA, PENNSYLVANIA, ASSIGNOR TO ELECTRIC CAR COMPANY OF AMERICA, OF PHILADELPHIA, PENNSYLVANIA.

ELECTRICALLY-PROPELLED VEHICLE.

No. 826,508.      Specification of Letters Patent.      Patented July 17, 1906.

Original application filed October 27, 1886, Serial No. 217,346. Divided and this application filed November 15, 1898. Serial No. 696,513.

*To all whom it may concern:*

Be it known that I, RUDOLPH M. HUNTER, of the city and county of Philadelphia, State of Pennsylvania, have invented an Improvement in Electrically-Propelled Vehicles, of which the following is a specification.

My invention has reference to electrically-propelled vehicles; and it consists of certain improvements which are fully set forth in the following specification and shown in the accompanying drawings, which form a part thereof.

This application is a division of my application, Serial No. 217,346, filed October 27, 1886, which eventuated in Patent No. 638,966, dated December 12, 1899.

My invention has special reference to electrically-propelled vehicles, whether they be in a form of pivoted trucks or made integral with the superstructure.

The characteristic features of my invention consist in supporting the motor or motors upon the axle or axles and sustaining them by a frame also carried by the axles, whereby the motors are both geared and journaled to an axle and preferably sustained independently of the car-body. The motor is preferably journaled upon the axle by suitable bearing arranged at considerable distance apart, so as to permit the motors to move more or less about their respective axles as centers, the free ends of the motors being preferably flexibly supported, as hereinafter described.

Referring more particularly to the construction shown, I employ the following arrangement of parts, to wit: To the axle or axles of the vehicle I journal one or more electric motors which have their journals so located that they are preferably balanced upon said axles. By this means the motor-shaft is allowed to move in an arc about the axle and is connected thereto by suitable gearing or power-transmitting devices. To prevent free rotation of the motor and take up the jar, it is supported by a spring device to the vehicle or truck frame, and this enables the first power of the motor in starting to be expended in putting the spring under tension and provides an elastic connection between the motor and axle, facilitating the starting of the vehicle into motion from a state of rest. I do not limit myself to any particular form of flexible or elastic connection, as the specific constructions are capable of much modification. Such a connection of motor may be applied to a car or vehicle having axles connected to the car-body, as in the case of ordinary street-cars, or to a car having pivoted trucks, the difference being simply the connection of the car-body with the axles and not modifying the arrangement of the motor with respect to the axles or its method of support.

As shown in this application, I prefer to use two motors, one on each axle and facing each other. The free ends of the motors may be connected to the opposite ends of the same supporting spring device.

In the drawings, Figure 1 is a section elevation of my improved car-truck for an electrically-propelled vehicle, taken on line $x x$ of Fig. 2. Fig. 2 is a plan view of same; and Fig. 3 is a sectional elevation corresponding to Fig. 1, showing a modification.

It is immaterial to my invention in this application what the source of power may be, as the current may be supplied from batteries carried by or moving with the cars or line conductors, as desired.

The construction shown in the drawings is such that the car-body of the vehicle may be directly supported upon the frame of the truck and wholly sustained by two axles and four wheels, or the car-body may be pivoted to two trucks constructed substantially as illustrated. In either case what is here shown may be termed a "truck for a car-body."

The truck proper may be made in any of the well-known ways. That shown consists of the frame B', provided with the usual side guides B² for the axle-boxes b, in which the axles D are journaled.

d represents the car-wheels.

Supported by the axle-boxes b independently of the frame B' are the equalizing-bars or side frames B³, between which and the frame B' are arranged the springs b', which in the construction shown are the only spring devices used between the truck-frame and axles. It is evident that the particular location of these springs b' between the axle-boxes and frame B' is immaterial. By the construction shown I am enabled to have the middle part of the truck free or unobstructed and for the disposal of the electrical connections or apparatus.

B⁴ is the pivot-plate for connection with the car-body.

A truck may be pivoted at each end of the car-body, if desired, in which case it would be like any ordinary car having eight wheels. Again, I may consider the frame B' as the vehicle-frame and as a complete vehicle, as it would be if the usual box or body were built upon it like an ordinary street-car.

E E are the electric motors and have the well-known horseshoe field-magnets. To each side of these magnets and their pole-pieces are secured brackets or frames F, having journals or bearings f, which fit upon the axles D and by which the motors are supported upon the said axles. These bearings or journals are on each side of the motor and considerably separated. The axles may pass between the field-magnets. By this construction the motor-shafts g are caused to remain at a fixed distance from the axles irrespective of the movement of the motor about said axles, and the yokes or keepers of the magnets of the motors are situated parallel with and in close proximity to the driving-axles. To the ends of the motor or drive-shafts are secured the pinions G, which preferably have considerable width. Meshing with these pinions and secured to the axles are spur-wheels H.

To prevent the free revolution of the motors about the axles and take up the jar, I connect them by links J' with the free end of a two-armed spring J, which is carried by a cross-frame i, secured to the equalizing frames or bars B³. For simplicity and to cause the strains on the two ends of the spring J to be in the same direction at the same time the motors are arranged to face each other. This enables the adoption of a cheap and effective construction. It is to be understood, however, that I do not limit myself to any particular elastic or flexible supporting connection for the motor, as my invention comprehends the elastic connection broadly.

A coil or other form of spring may be used in place of the flat plate-spring.

Now as the motors start up the first tendency to revolution of the armatures will be to oscillate the motors and put the springs J under tension. As the resistance of the springs is gradually increased the tendency to rotate the axle also gradually increases, and by this connection the effective power of the motor on starting is greatly increased. The spring J acts the same when the motor is run forward or backward.

It will be observed that the connection of the motors with the spring-supports at the free ends is such that the connection is interposed between two portions of the spring devices, one opposing an upward motion of the free end of the motor and the other opposing a downward motion thereof. In the case where the coiled springs are used, Fig. 3, the transverse frame i carries at its top lateral extensions K, from which bolts I² depend and pass through an extending lug or projection from the motor. The springs I' are arranged above and below this projection from the motor and surrounding and carried by the bolt, so as to permit, in effect, an upwardly and downwardly acting spring-buffer to take up the jar or vibration of the free end of the motor.

The cross-bars I and equalizing-bars B³ constitute a frame carried upon the axles, and said frame acts as the support for the springs connecting with the electric motors and is practically at a lower level than the motors and extends transversely across the vehicle below the springs which support the motors.

While this invention is specially designed for railway-cars, it is evident that it equally applies to vehicles of all descriptions, whether it is adapted to run upon rails or roads. Hence in using the terms "car" and "car-body" I do not intend to confine myself to any special type of vehicle.

So far as my invention in this application is concerned, it is immaterial what source of electrical power may be employed.

I do not limit myself to any particular details of construction, as they may be modified in various ways without in the least departing from the principles of my invention.

Having now described my invention, what I claim as new, and desire to secure by Letters Patent, is—

1. In a motor-truck, the combination with the axle-box frame having side bars, of a motor sleeved on one of the truck-axles, a cross-bar extending between the side bars of said frame, and a connection for the free end of the motor comprising a plurality of oppositely-acting springs supported by said cross-bar.

2. In a motor-truck, the combination with the axles, of an independent frame hung from the axles, a motor sleeved to one of the axles, a cross-bar included in said frame, and oppositely-acting springs above and below a connection with the free end of the motor, said springs connecting with said cross-bar.

3. In a motor-truck, the combination with the axle-box frame having side bars, of a motor sleeved on one of the truck-axles, a cross-bar extending between the side bars of said frame, and a connection for the free end of the motor comprising a plurality of oppositely-acting springs supported by said cross-bar.

4. In an electrically-propelled vehicle, the combination of a vehicle-body sustained upon springs, a truck-frame independent of the vehicle-body, and having a transverse bar, an electric motor hinged to the axle and having its free end directed toward the transverse bar, and a double spring-support for the free end of the motor connecting with said transverse bar one portion of said spring receiving the upward and the other portion the downward thrust of the motor.

5. In an electrically-propelled vehicle, the combination of the wheels and two axles, a truck-frame carried by the axles independent of the vehicle-body and having a transverse portion intermediate of the axles, an electric motor hinged to each of the axles and having its free end directed toward the other axle so as to bring the free ends of the two motors between the axles, and a separate double spring connection between the transverse portion of the truck-frame and each of the electric motors at their free ends whereby both the upward and downward thrusts of the motors are received upon separate portions of the same spring devices.

6. In a motor-truck, the combination with the axle-box frame having side bars, of a motor sleeved on one of the truck-axles, a cross-bar extending between the side bars of said frame, and a spring-support for the free end of the motor carried by the cross-bar and having a spring action upon the motor both in the upward and downward movements of its free end.

7. In a motor-truck, the combination with the axles, of an independent frame hung from the axles, a motor sleeved to one of the axles, and a spring-support for the free end of the motor carried by the independent frame and comprising two portions one exerting a spring action against the rising of the free end of the motor and the other exerting a spring action against the downward movement of the free end of the motor.

8. In a motor-truck, the combination with the axles, of an independent frame hung from the axles, a motor sleeved to one of the axles, a spring-support for the free end of the motor carried by the independent frame and comprising two portions one exerting a spring action against the rising of the free end of the motor only when the motor is in operation and the other exerting a spring action against the downward movement of the free end of the motor both when the motor is in and out of operation, and means extending from the free end of the motor for forming a connection with the spring-support intermediate of its two portions.

In testimony of which invention I hereunto set my hand.

R. M. HUNTER.

Witnesses:
J. W. KENWORTHY,
R. M. KELLY.